United States Patent [19]
Jeon

[11] Patent Number: 5,309,291
[45] Date of Patent: May 3, 1994

[54] CIRCUIT FOR COMPENSATING THE ERRORS OCCURRING WHEN CHANGING THE PLAYING BACK SPEED OF A DOUBLE AZIMUTH 4-HEAD VTR

[75] Inventor: Jin S. Jeon, Kyungki, Rep. of Korea

[73] Assignee: GoldStar Co., Ltd., Rep. of Korea

[21] Appl. No.: 808,707

[22] Filed: Dec. 17, 1991

[30] Foreign Application Priority Data

Dec. 22, 1990 [KR] Rep. of Korea .................. 90-21408

[51] Int. Cl.$^5$ .............................................. H04N 5/78
[52] U.S. Cl. .................................... 360/36.1; 360/64; 360/10.3; 358/337
[58] Field of Search ................... 360/36.1, 36.2, 64, 360/67, 8, 10.3; 358/337, 338, 339, 154, 155

[56] References Cited

U.S. PATENT DOCUMENTS

| | | |
|---|---|---|
| 4,614,985 | 9/1986 | Tsurata ........................... 360/64 |
| 4,672,469 | 6/1987 | Namiki et al. .................. 360/64 X |
| 5,126,892 | 6/1992 | Nagasawa et al. ............... 360/64 |

Primary Examiner—Andrew L. Sniezek
Attorney, Agent, or Firm—Morgan & Finnegan

[57] ABSTRACT

A circuit for compensating the errors occurring when changing the playing back speed of a double azimuth 4-head VTR includes first and second switches for switching data retrieved by four heads and amplified in response to head switching signals, a comparator for comparing the output signals of the switches, an alternate delay circuit for receiving the head comparing switching signals of the comparator and the head switching signals to delay horizontal synchronization by 2H during performing head switching between fields and not during not performing the head switching, a multiplexer for generating control signals in response to the output signals of the alternate delay circuit and head switching pulses, a third switch for transmitting data in response to the control signals of the multiplexer, a high frequency output unit of a pre-amplifier for receiving the outputs of the third switch, and a time base correction (TBC) circuit for receiving the video signals of the high frequency output unit of the pre-amplifier to retrieve the previous 1H signals from a field memory and substitute so as to independently operate the clocks of a recording unit and a decoding unit, thereby compensating the horizontal and vertical timing errors of the signals provided by the alternate delay circuit.

1 Claim, 7 Drawing Sheets

CIRCUIT FOR COMPENSATING THE ERRORS OCCURRING WHEN CHANGING THE PLAYING BACK SPEED OF A DOUBLE AZIMUTH 4-HEAD VTR

BACKGROUND OF THE INVENTION

1. Field of the Invention

The present invention concerns a circuit for compensating the errors occurring when changing the playing back speed of a double azimuth 4-head VTR, and more particularly means for compensating vertical and horizontal skew errors during the playing back speed change to improve the picture quality.

2. Description of the Related Art

Figure 1:
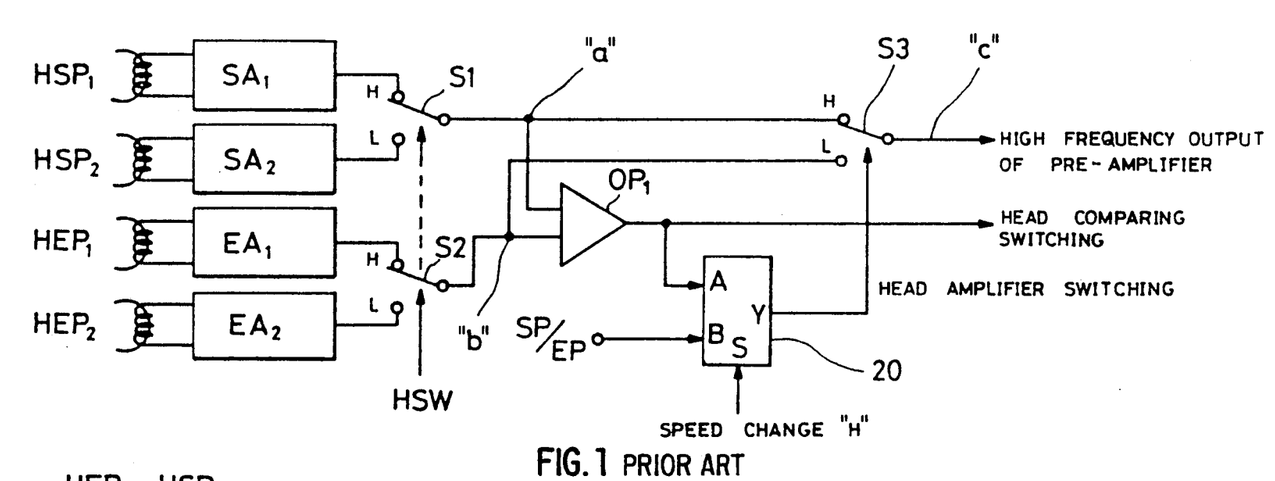
FIG. 1 is a block diagram for illustrating a conventional circuit for compensating vertical skew errors.

Conventionally, as shown in FIG. 1, the signals of the double azimuth four heads HSP1, HSP2, HEP1 and HEP2 are connected via amplifiers SA1, SA2, EA1 and EA2 to switches S1 and S2 switched by switching pulse signals HSW, and the signals a and b loaded on the common terminal of said switches S1 and S2 are applied to a comparator to generate head comparing switching signals. In addition, the signals loaded on the common terminal of the switches S1 and S2 are connected to a control switch S3 controlled by a multiplexer 20 for receiving the head comparing switching signals and head switching pulses SP/EP to transmit data, thus producing high frequency signals of a pre-amplifier. In such conventional circuit comprising the double azimuth for heads HSP1, HSP2, HEP1 and HEP2, the spatial interval between two heads is greater in the specified long time speed heads HEP1 and HEP2 than in the standard speed heads HSP1 and HSP2 in the drum rotating speed, thus resulting in a double azimuth head with about 2H (H is TV scanning lines) time interval.

Figure 2:
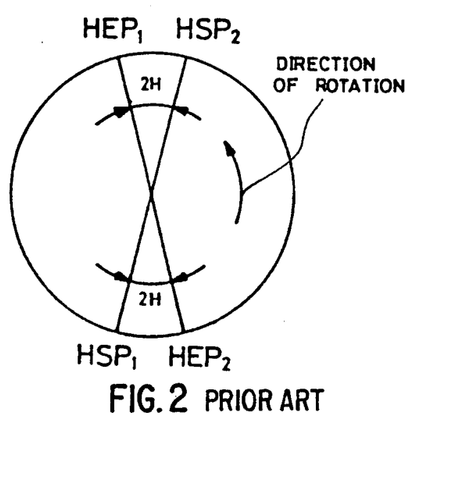
FIG. 2 is a plane view for illustrating the positions of a drum for mounting conventional double azimuth four heads.
Figure 3:
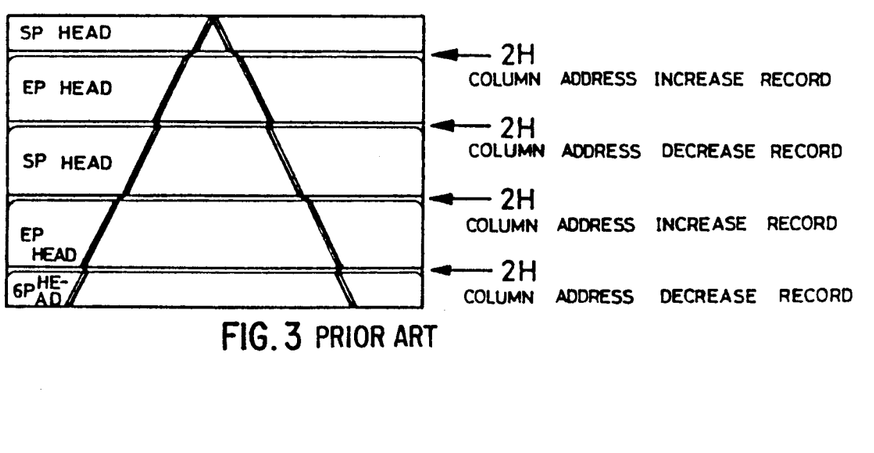
FIG. 3 illustrates the vertical skew waveforms of a picture when changing the playing back speed of a conventional double azimuth 4-head.
Figures 4A, 4B, 4C, 4D, 4E:
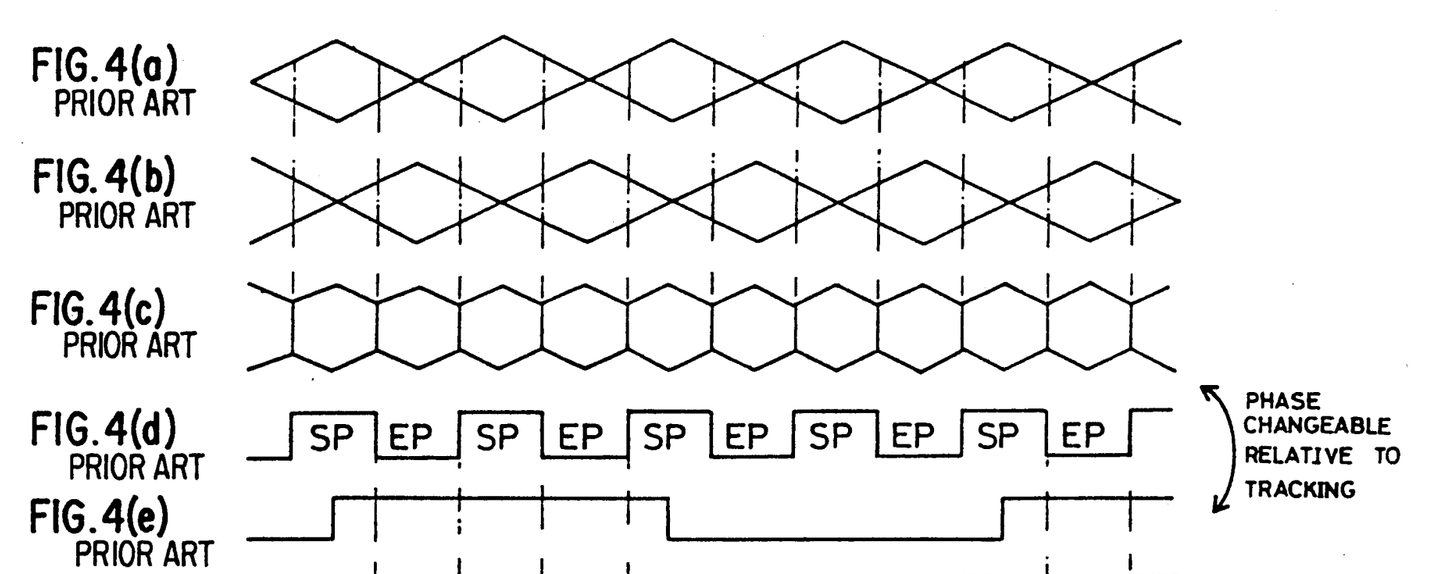
FIGS. 4(a) to 4(f) illustrate the waveforms of high frequency envelope and switching signals of the conventional double azimuth 4-head at the terminals of FIG. 1.
Figure 4F:
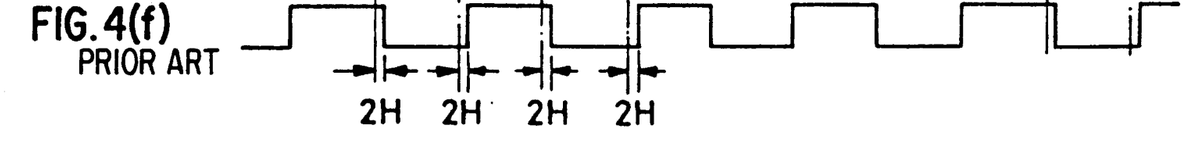

The spatial interval between a pair of the double azimuth heads is $2H \pm \alpha$ in the drum rotating speed, as shown in FIG. 2. Hence, when changing the speed, head output waveforms as shown in FIGS. 4(a) and 4(b) and the high frequency output waveform as shown in FIG. 4(c) appear so that parts of the picture are separated upwards and downwards with a gap corresponding to 2H vertically during changing of head from SP head to EP head, as shown in FIG. 3. Alternatively, the gap corresponding to 2H appears inwardly reduced in the picture during changing of head from EP head to SP head. Moreover, since there is a limitation in the preciseness of the horizontal spatial dimension between 2H of the double azimuth 4-head, a horizontal skew between heads occurs near the position at which the changing of head is made from SP head to EP head or vice versa. Namely by the head switching signal (the waveform as shown in FIG. 4(e) occurs a skew to make a phase shift of 2H as shown in FIG. 4(f).

Thus, a vertical skew occurs to move the picture upwards or downwards in the vertical switching position of the head because the spatial interval of the double azimuth four heads is 2H, while a horizontal skew occurs by $\alpha$ because the spatial interval of the double azimuth heads is $2H \pm \alpha$. Hence, the conventional circuit does not provide a clear and stable picture during the speed change.

SUMMARY OF THE INVENTION

The object of the present invention is to provide a circuit for compensating vertical and horizontal skew errors occurring when changing the playing back speed of a double azimuth 4-head VTR, so as to improve the picture quality.

According to the present invention, a circuit for compensating vertical and horizontal skew errors occurring when changing the playing back speed of a double azimuth 4-head VTR comprises an alternate delay circuit for receiving the head comparing switching signals of a comparator and head switching signals to delay horizontal synchronization by 2H during performing head switching between fields and not during performing said head switching, and a time base correction (TBC) circuit for receiving the video signals of high frequency output means of a pre-amplifier to retrieve the previous 1H signals from a field memory and substitute so as to independently operate the clocks of a recording means and a decoding means, thereby compensating the horizontal skew errors of the signals in vertical head switching position.

The present invention will now be described more specifically with reference to the drawings attached only by way of example.

DETAILED DESCRIPTION OF THE INVENTION

Figure 5:
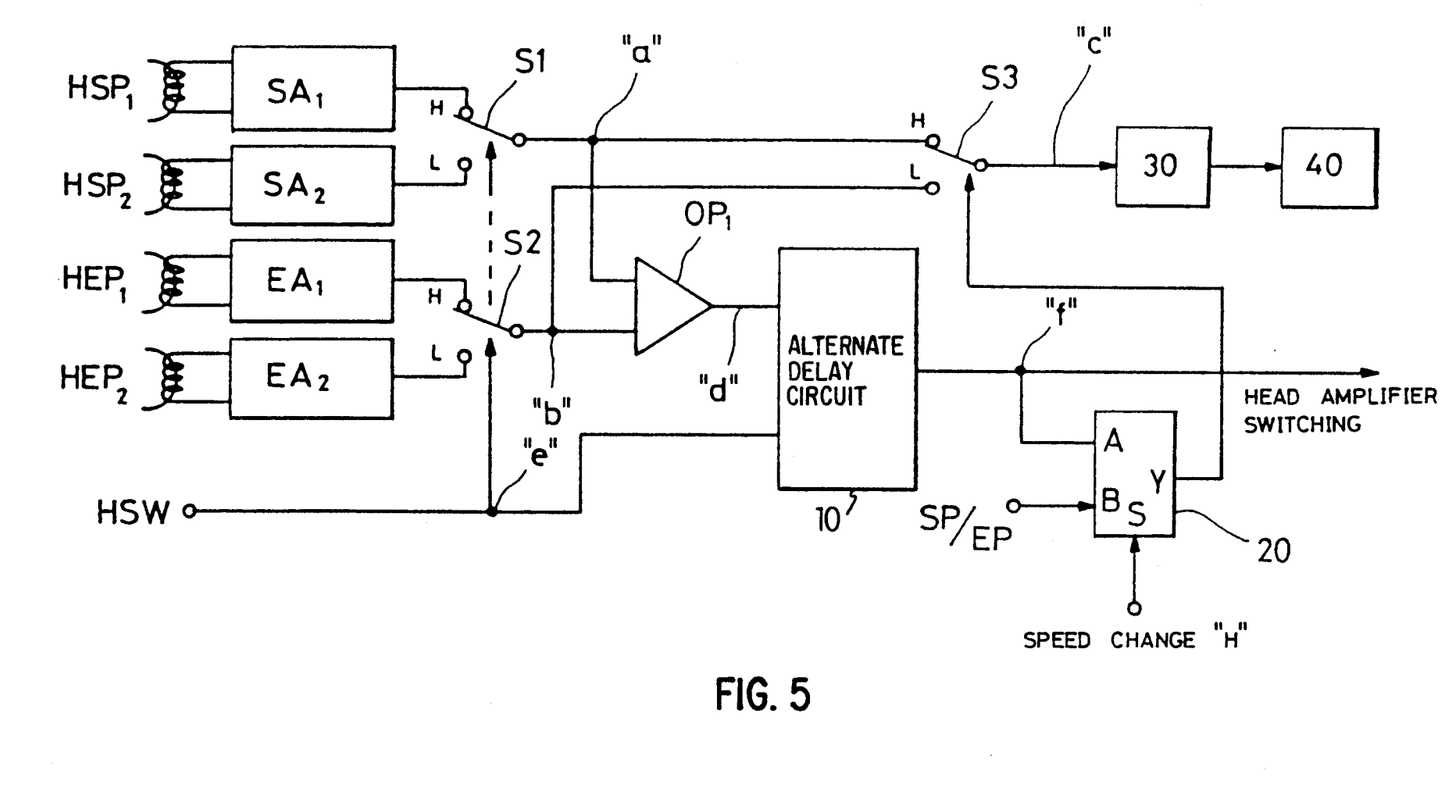
FIG. 5 is a block diagram of a circuit for compensating the errors occurring when changing the playing back speed of a double azimuth 4-head VTR according to the present invention.

Referring to FIG. 5, there are shown four heads HSP1, HSP2, HEP1 and HEP2 respectively connected via amplifiers SA1, SA2, EA1 and EA2 to switches S1 and S2 controlled by head switching pulses HSW. The common terminals of the switches S1 and S2 are connected to a comparator OP1 to compare the output signals "a" and "b".

An alternate delay circuit 10 receives the head comparing switching signals "d" delivered by the comparator OP1 and head switching signals HSW to increase and decrease head amplifier switching time by 2H between alternate fields so as to delay the skew signals occurring during head switching, and not to delay the normal signals. Thus a TBC (Time Base Correction) circuit 40 compensates the horizontal and vertical errors of reproduced video signals delivered by the high frequency output terminal 30 of a pre-amplifier.

The TBC circuit 40 is a conventional system used to correct the time axis of the horizontal and vertical synchronization, which is disclosed in U.S. Pat. No. 3,860,952. According to the present invention, the signals of the alternate delay circuit, namely, the skew occurring during the head switching is delayed so as to provide the TBC circuit 40 only with correct signals, thus compensating time errors.

The output signals "a" and "b" are selectively delivered to the output terminal of the high frequency output terminal 30 of the pre-amplifier by the output signal of the multiplexer 20 provided with the output signal (+) of the delay circuit 10 and head switching pulses SP/EP.

Figure 6:
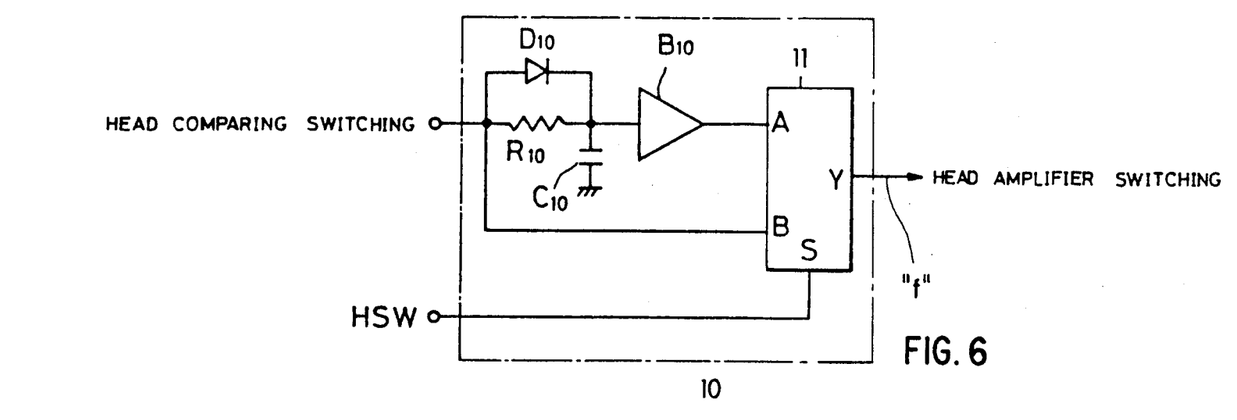
FIG. 6 is an embodiment of an alternate delay circuit for compensating the errors according to the inventive circuit of FIG. 5.

The alternate delay circuit 10, as shown in FIG. 6 comprises an integrating circuit consisting of a resistor R10, capacitor C10 and diode D10 for integrating head comparing switching signal, and a buffer B10 for amplifying the output of the integrating circuit and multiplexer 11 for delaying horizontal synchronization.

Figure 7:
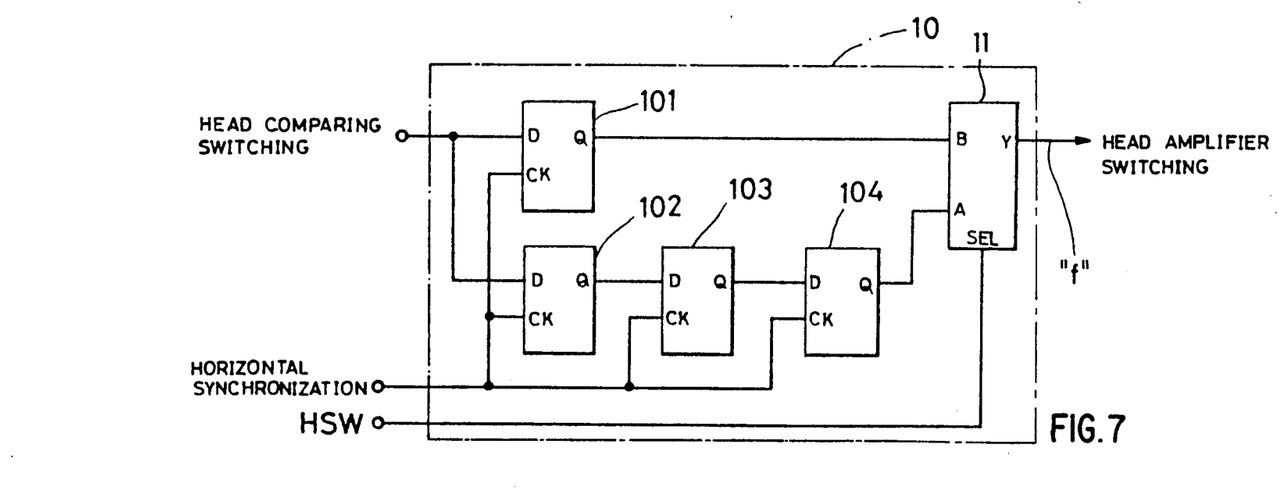
FIG. 7 is a second embodiment of an alternate delay circuit for compensating the errors according to the inventive circuit of FIG. 5.

Alternatively, the alternate delay circuit 10, as shown in FIG. 7, comprises a plurality of D-flip-flops 101-104 to fix the horizontal synchronization signal that is delayed by 2H to produce head amplifier switching signal delayed by 2H in response to head switching signals HSW in rising and falling during one field and signals not delayed by 2H during the remaining one field.

Figure 8:
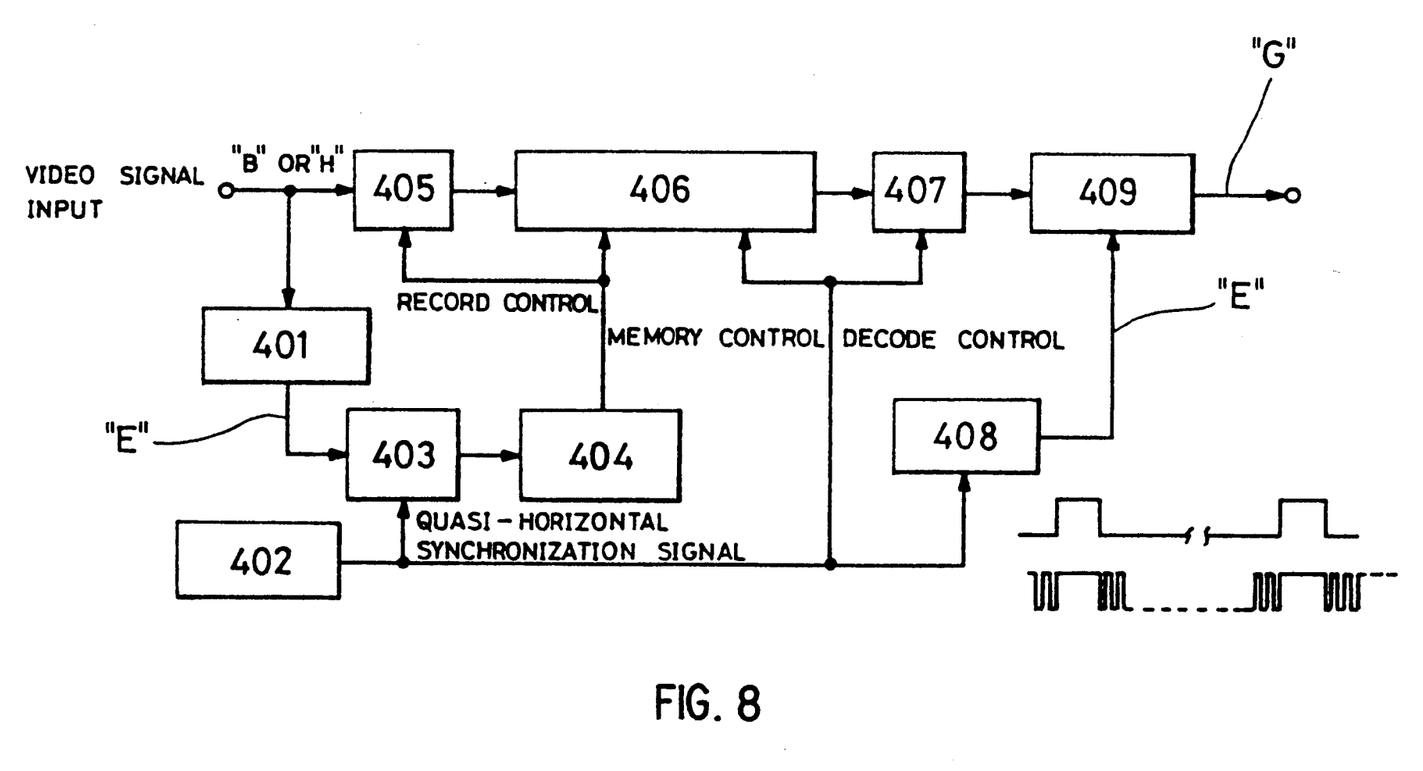
FIG. 8 is a TBC circuit for utilizing the signals of an alternate delay circuit according to the present invention.

The TBC circuit 40 comprises, as shown in FIG. 8, a synchronization signal separation circuit 401 for separating synchronization signals from input video signals, a reference clock signal generator 402 for quasi horizontal synchronization signals, a phase comparator 403 for comparing the phases of the synchronization signals produced by the synchronization signal separation circuit 401 and the quasi horizontal synchronization signals produced by the reference clock pulse generator 402, a record signal clock pulse generator 404 for record signal clock pulses in the output signals of the comparator 403, an analog/digital (A/D) converter 405 for converting the video signals into digital signals in response to the record control signal produced from the record signal clock pulse generator 404, a field memory 406 for storing information signals during every field in response to the memory control signal produced from the reference signal clock pulse generator 402 and the record control signal produced from the record signal clock pulse generator 404, a D/A converter 407 for converting the output signals of the field memory 406 into analog signals, a synchronization signal generator 408 for receiving the quasi horizontal synchronization signal produced from the reference clock signal generator 402 so as to generate synchronization signals, and a mixer 409 for mixing the analog signals of the D/A converter 407 and the synchronization signals of the synchronization signal generator 408.

Figure 11:
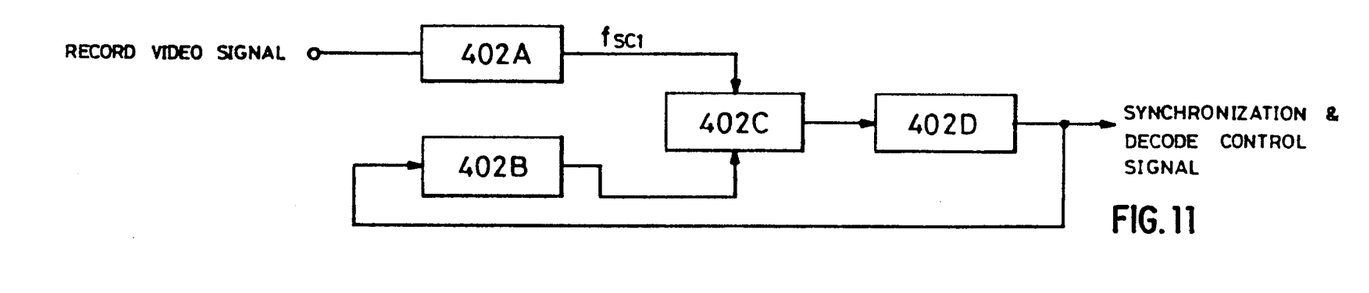
FIG. 11 is a block diagram for illustrating a reference clock pulse generator of a horizontal error compensation circuit according to the present invention.

The reference clock signal generator 402, as shown in FIG. 11, comprises a frequency separation circuit 402A for separating the frequencies fsc of recorded video signals, a voltage control generator 402D for generating oscillation signals by controlling voltages according the compared phases of the phase comparator 402, and n-frequency dividing circuit 402B for dividing the output pulses of the voltage control generator 402D by n to feed back the divided signals to the phase comparator 402C, thereby eliminating the accumulated errors.

The operation of the inventive circuit is embodied in both analog and digital. The analog method is to alternately produce a signal obtained by integrating the head comparing switching signals of the amplifiers SA1, SA2 EA1 and EA2 through the resistor R10 and capacitor C10, the signal being delayed by 2H in falling edge, and the original head switching output signals in response to the head switching pulses HSW.

The digital method, as shown in FIG. 7, comprises the steps of fixedly switching the head comparing switching signals through the D-flip-flops 101 and 102 in response to the horizontal synchronization signal, delaying the signals by 2H through the D-flip-flops 103 and 104, producing head amplifier switching signals delayed by 2H in both rising and falling edges during any one field by the multiplexer 20 for selecting signals in response to the head switching pulses HSW, and producing the signals fixed to the synchronization signal without 2H delay. In the double azimuth 4-head, there occur vertical and horizontal skews in the playing back speed change as shown in FIG. 3. In this case, the vertical discontinuity of the picture in 2H is compensated by decreasing the 2H column address in the picture stored in the memory, when switching from the leading head EP to the trailing head SP.

Alternatively, when switching from the trailing head SP to the leading head EP, the vertical discontinuity of the picture is compensated by increasing the record column address to return to the original position.

Meanwhile, the relative speed change in recording and playing back and the spatial limitation in head assembling cause the time difference of $2H \pm \alpha$ between a pair of the double azimuth four heads, thereby producing a horizontal skew of $\alpha$. Namely, the record is made in reference to the synchronization signal of the input video signal, and the reference clock signal generator 402 generates standard synchronization and decoding signals as shown in FIG. 11.

Figure 9A:
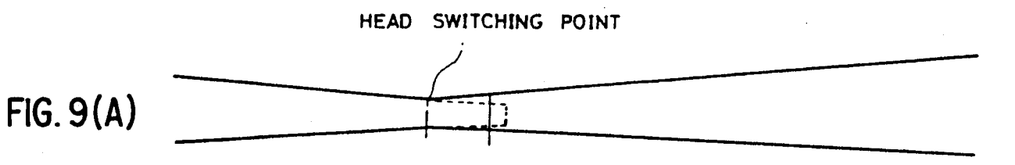
FIGS. 9(A) to 9(I) illustrate signal waveforms for describing error compensation procedures of a recording means and decoding means according to the present invention.
Figure 9B:
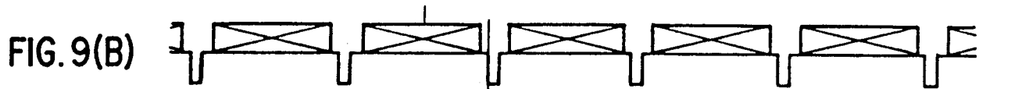
Figure 9C:
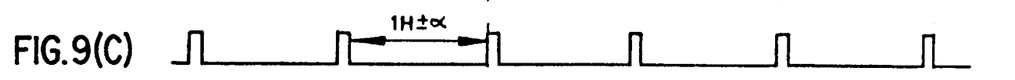
Figure 9D:
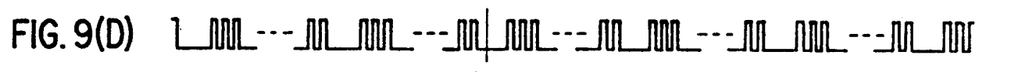
Figure 9E:
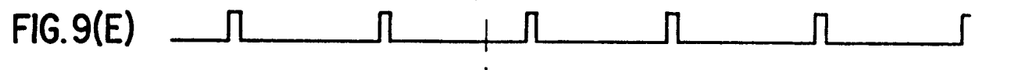
Figure 10:
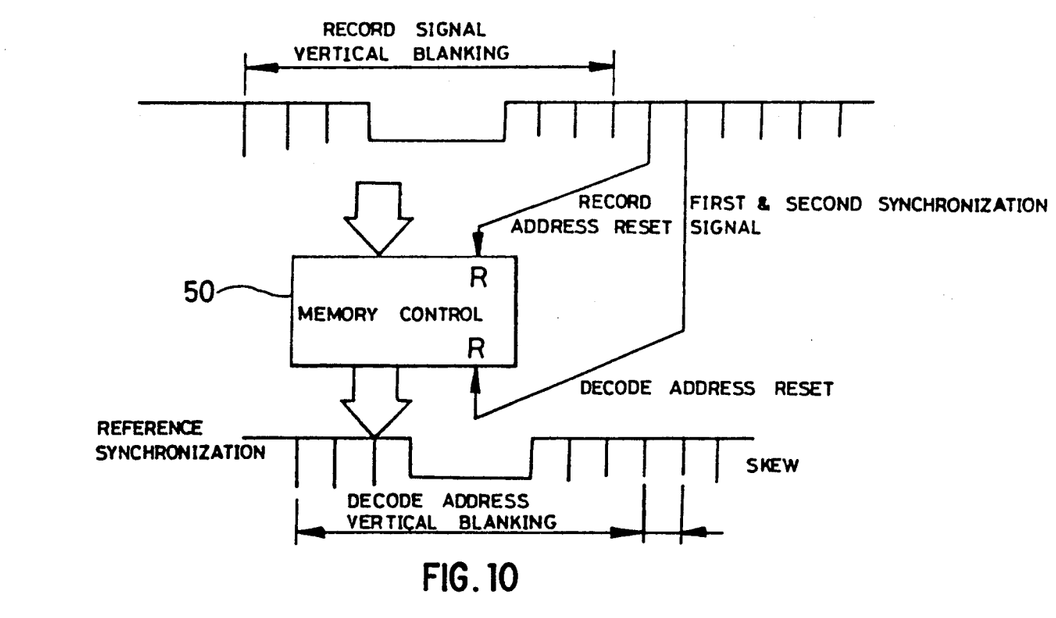
FIG. 10 illustrates the reset procedures of a recording means and decoding means according to the present invention.

FIG. 9(A) indicates the switching point according to the comparison of the envelopes of a pair of the double azimuth heads, FIG. 9(B) discontinuing pints in the middle of 1H picture of a reproduced signal, and FIG. 9(C) separated synchronization signal. As shown in FIG. 9(D) and FIG. 10, since the record clock signals are intermittently stopped at every H, the PLL (Phase-Locked Loop) may record the signals even by compensating one clock pulse error. FIG. 9(E) describes the horizontal synchronization reference signal for decoding.

As shown in FIG. 8, the record means and decoding means are operated in the time interval during which the errors may be treated in reading and recording the signal indicating the correlation of the record means and decoding means. Namely, the address of the recording means is reset in the first horizontal synchronization signal at which the vertical blank region of the input video signal is ended, and the address of the decoding means is reset after 1H from the resetting of the recording means. Hence, there occurs a horizontal skew corresponding to the difference between non-standard video signal recorded within one field time from the end point of the vertical blank in the decoded signal and standard video signal of the decoding means. This is compensated not so as to be monitored within 1H-19H of the TV screen oversan region after the vertical blank.

Figure 9F:
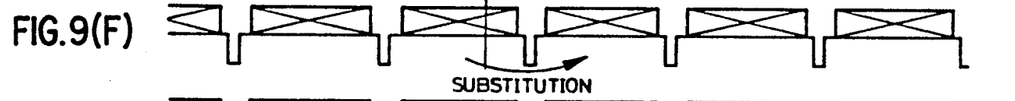
Figure 9G:
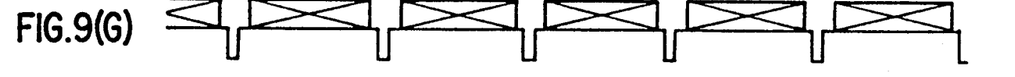
Figure 9H:
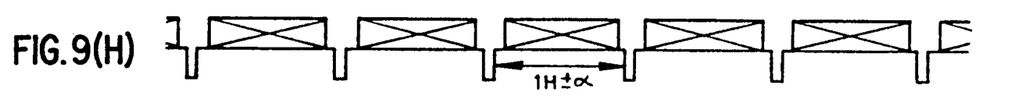
Figure 9I:
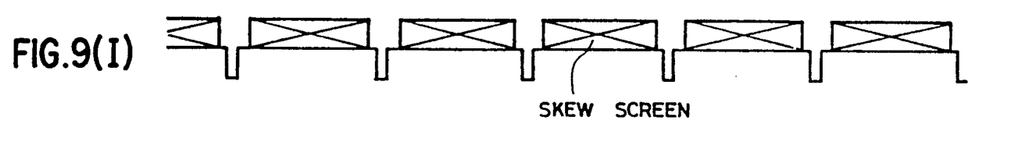

Thus, if performing the address reset after finishing the vertical blank, the skew of the head switching point is eliminated (head switching is made in 6.5H±1.5H in advancement of the horizontal synchronization signal), and as shown in FIGS. 9(F) and 9(I), the 1H containing the skew is not decoded according to the switching signals (head amplifier switching signals) of a pair of the double azimuth heads, while the signal of the previous H is repeatedly retrieved from the memory so as to control the substitution as shown in FIGS. 9(G) and 9(I). If, as shown in FIG. 10, not considering the skew caused by the accumulated errors between the standard video signal retrieved from the memory and the input non-standard video signal after the vertical blank, there occurs 1H substitution error containing the skew information caused by the accumulated errors of the decoded reference clock signals, standard synchronization signal and the input non-standard video signal.

In order to compensate this errors, if the PLL for producing the reference signal clock pulses is defined with the reference clock pulse generator 402 based on comparison of the phases of the color carrier wave frequency (fsc) of the decoded video signal and the frequency (fsc) of the input video signal as shown in FIG. 11, there are eliminated at most the errors accumulated in the end point of the vertical blank so as to almost completely prevent the skew errors.

As stated above, the inventive circuit may precisely compensate the vertical skew caused by the spatial interval (2H±α) of a pair of the double azimuth heads amplifier switching point of the pre-amplifier between fields by 2H because of the constant head switching position between fields at a speed change of odd number times. Moreover, in the spatial interval (2H±α) of a pair of the double azimuth four heads, the horizontal skew of α may be eliminated by substituting the previous 1H in place of 1H containing the skew by maintaining the 1H interval between the record means and the decode means, thus improving the picture quality.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

What is claimed is:

1. A circuit for compensating horizontal and vertical timing errors occurring when changing a playing back speed of a double azimuth 4-head VTR having four heads in a reading and writing system having reading and writing clock and a field memory storing 1H signals, the circuit comprising:

first and second switches switching data retrieved by the four heads and amplified in response to head switching signals and outputting first and second output signals;

a comparator comparing the first and second output signals received from said first and second switches and outputting head comparing switching signals;

an alternate delay circuit receiving the head comparing switching signals from said comparator and said head switching signals, and delaying horizontal synchronization by 2H during the switching of the data to delay skew signals and not to delay normal signals, said alternate delay circuit comprising an integrating circuit integrating the head comparing switching signals and outputting an integrated signal, a buffer amplifying the integrated signal received from the integrating circuit to a given value and outputting an amplified signal, and a delay multiplexer receiving the amplified signal from said buffer and the head switching signal and outputting delay signals;

a multiplexer generating control signals in response to the delay signals received from said alternate delay circuit and SP/EP head changing pulses;

a third switch transmitting one of the first and second output signals received from one of the first and second switches in response to the control signals received from said multiplexer as a third output signal;

a pre-amplifier having a high frequency output terminal, receiving and amplifying the third output signal from said third switch and outputting video signals via the high frequency output terminal; and a time base correction (TBC) circuit for receiving the video signals from said high frequency output terminal of the pre-amplifier to retrieve the 1H signals from the field memory to independently operate the reading and writing clocks, thereby compensating the horizontal and vertical timing errors of the delay signals output by said alternate delay circuit.

* * * * *